United States Patent
Zimmer et al.

(10) Patent No.: US 10,473,512 B2
(45) Date of Patent: Nov. 12, 2019

(54) DETECTING AN INACCURATE FLOW RATE MEASUREMENT BY A VIBRATORY METER

(71) Applicant: Micro Motion, Inc., Boulder, CO (US)

(72) Inventors: Patrick John Zimmer, Denver, CO (US); Craig Andrew Riggins, Denver, CO (US)

(73) Assignee: Micro Motion, Inc., Boulder, CO (US)

( * ) Notice: Subject to any disclaimer, the term of this patent is extended or adjusted under 35 U.S.C. 154(b) by 231 days.

(21) Appl. No.: 15/562,806

(22) PCT Filed: Apr. 14, 2015

(86) PCT No.: PCT/US2015/025807
§ 371 (c)(1),
(2) Date: Sep. 28, 2017

(87) PCT Pub. No.: WO2016/167752
PCT Pub. Date: Oct. 20, 2016

(65) Prior Publication Data
US 2018/0052036 A1 Feb. 22, 2018

(51) Int. Cl.
*G01F 25/00* (2006.01)
*G01F 1/84* (2006.01)
*G01F 15/02* (2006.01)

(52) U.S. Cl.
CPC ........ *G01F 25/0007* (2013.01); *G01F 1/8436* (2013.01); *G01F 15/02* (2013.01)

(58) Field of Classification Search
CPC ....... G01F 1/8436; G01F 15/02; G01F 25/007
See application file for complete search history.

(56) References Cited

U.S. PATENT DOCUMENTS

| | | | | |
|---|---|---|---|---|
| 5,687,100 A | * | 11/1997 | Buttler | G01F 1/8413 702/100 |
| 6,092,409 A | * | 7/2000 | Patten | G01F 1/8413 702/100 |
| 6,556,931 B1 | * | 4/2003 | Hays | G01F 1/8436 702/100 |
| 7,360,453 B2 | * | 4/2008 | Rieder | G01F 1/8409 73/861.357 |
| 8,650,929 B2 | * | 2/2014 | Pankratz | G01F 1/8436 73/1.34 |
| 2018/0003538 A1 | * | 1/2018 | Schollenberger | G01F 1/74 |

FOREIGN PATENT DOCUMENTS

| | | |
|---|---|---|
| JP | 2002062169 A | 2/2002 |
| WO | 96/05484 A1 | 2/1996 |
| WO | 00/19175 A1 | 4/2000 |
| WO | 01/31298 A2 | 5/2001 |
| WO | 2011008307 A1 | 1/2011 |

\* cited by examiner

*Primary Examiner* — Justin N Olamit
(74) *Attorney, Agent, or Firm* — The Ollila Law Group LLC

(57) ABSTRACT

A method of detecting an inaccurate flow rate measurement by a vibratory meter is provided. The method includes flowing fluid through the vibratory meter and measuring a flow rate and a density of the fluid with the vibratory meter, and calculating a density change rate of the fluid. The method also includes determining if the measured flow rate is inaccurate based on a comparison between the measured density and a density reference, and a comparison between the density change rate and a density change rate reference.

20 Claims, 9 Drawing Sheets

DETECTING AN INACCURATE FLOW RATE MEASUREMENT BY A VIBRATORY METER

TECHNICAL FIELD

The embodiments described below relate to vibratory meters and, more particularly, to detecting an inaccurate flow rate measurement by a vibratory meter.

BACKGROUND

Vibratory meters, such as, for example, vibrating densitometers and Coriolis flow meters are generally known and are used to measure mass flow and other information for materials within a conduit. The vibratory meter comprises a sensor assembly and an electronics segment. The material within the sensor assembly may be flowing or stationary. Each type of sensor may have unique characteristics, which a vibratory meter must account for in order to achieve optimum performance.

Exemplary Coriolis flow meters are disclosed in U.S. Pat. Nos. 4,109,524, 4,491,025, and Re. 31,450 all to J. E. Smith et al. The sensor assemblies in the Coriolis flow meters have one or more conduits of straight or curved configuration. Each conduit configuration in the sensor assembly has a set of natural vibration modes, which may be of simple bending, torsional, or coupled type. Each conduit can be driven to oscillate at a preferred mode. Material flows into the sensor assembly from a connected pipeline on the inlet side of the sensor, is directed through the conduit(s), and exits the sensor through the outlet side of the sensor. The natural vibration modes of the vibrating material filled system are defined in part by the combined mass of the conduits and the material flowing within the conduits.

When there is no flow through the sensor assembly, a driving force applied to the conduit(s) causes all points along the conduit(s) to oscillate with identical phase or small "zero offset," which is a time delay measured at zero flow. As material begins to flow through the sensor assembly, Coriolis forces cause each point along the conduit(s) to have a different phase. For example, the phase at the inlet end of the sensor lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the phase difference between the pick-off sensors. The phase difference between the two or more pick-off sensors is proportional to the mass flow rate of material flowing through the conduit(s).

Meter electronics connected to the driver generates a drive signal to operate the driver and determines a mass flow rate and other properties of a material from signals received from the pick-off sensors. The driver may comprise one of many well known arrangements; however, a magnet and an opposing drive coil have received great success in the flow meter industry. An alternating current is passed to the drive coil for vibrating the conduit(s) at a desired flow tube amplitude and frequency. It is also known in the art to provide the pick-off sensors as a magnet and coil arrangement very similar to the driver arrangement. However, while the driver receives a current which induces a motion, the pick-off sensors can use the motion provided by the driver to induce a voltage.

The vibratory meters are used in many applications, including custody transfer. Custody transfer typically involves transferring a batch of material from seller to buyer in, for example, a tank. An example of a custody transfer is fuel bunkering. Bunkering refers to the practice of storing and transferring marine fuel oils, which have come to be known as bunker fuels. Bunker fuel comprises a relatively heavy petroleum derivative that is used in heating or in large industrial and/or marine engines. Bunker fuel is generally heavier and more viscous than gasoline or diesel.

For ship fueling, large amounts of fuel may be temporarily stored in a barge or other container for the purpose of transferring fuel from shore to a ship. A bunker may be located on a dock or other port facility, or may be carried by a barge or other refueling vehicle. During bunkering, the fuel measurement usually comprises an empty-full-empty batching process. This empty-full-empty batching process can cause gas to become entrained in the fuel.

Improvements in vibratory meters have made it possible to obtain more accurate measurements of fuel, even when the fuel has entrained gas. However, a problem can exist whenever flow is stopped, for example, at the beginning or at the end of the bunkering process due to a change in the zero offset of the vibrating meter. Even after fuel has stopped flowing through the vibratory meter, the flow tubes continue to vibrate. Ideally, the time delay between the pick-off sensors would return to the original zero offset value when the flow through the tubes is zero. As long as the time delay returns to the original zero offset, the vibratory meter will report a zero mass flow. However, various factors attribute to the zero offset of the sensor assembly and some of the factors may change either during the bunkering process or after the last zeroing process.

For example, while many vibratory meters are capable of maintaining accurate measurements despite entrained gas, in some situations when the flow through the flow tubes falls to zero, the entrained gas can lead to an imbalance that creates asymmetric damping between the inlet and the outlet side of the vibrating meter's sensor assembly. The asymmetric damping can cause a time delay between pick-offs, which may be different than the original zero offset and thus may be interpreted as real flow. This problem may also be experienced if, for example, the sensor assembly is only partially filled with fluid, for example, which may occur during bunkering.

Accordingly, there is a need for detecting an inaccurate flow rate measurement by a vibratory meter. There is also a need to provide methods and apparatuses for detecting inaccurate flow rate measurements with existing installed flow meters and without additional installed hardware.

SUMMARY

A method of detecting an inaccurate flow rate measurement by a vibratory meter is provided. According to an embodiment, the method comprises flowing fluid through the vibratory meter, measuring a flow rate and a density of the fluid with the vibratory meter, and calculating a density change rate of the fluid. The method determines if the measured flow rate is inaccurate based on a comparison between the measured density and a density reference and a comparison between the density change rate and a density change rate reference.

An apparatus for detecting an inaccurate flow rate measurement by a vibratory meter is provided. According to an embodiment, the apparatus comprises an interface configured to receive a measured flow rate and a measured density from the vibratory meter and a processing system communicatively coupled to the interface. The processing system is configured to calculate a density change rate of the fluid and determine if the measured flow rate is inaccurate based on a comparison between the measured density and a density reference and a comparison between the density change rate and a density change rate reference.

ASPECTS

According to an aspect, a method of detecting an inaccurate flow rate measurement by a vibratory meter comprises flowing fluid through the vibratory meter and measuring a flow rate and a density of the fluid with the vibratory meter, calculating a density change rate of the fluid, and determining if the measured flow rate is inaccurate based on a comparison between the measured density and a density reference and a comparison between the density change rate and a density change rate reference.

Preferably, the method further comprises excluding the measured flow rate from a total flow calculation if the measured flow rate is inaccurate.

Preferably, the density reference is a density measured prior to the measurement of the density of the fluid in the vibratory meter.

Preferably, the comparison between the measured density and the density reference comprises determining if the measured density is less than the density reference.

Preferably, the comparison between the density change rate and the density change rate reference is comprised of determining if the density change rate is less than the density change rate reference.

Preferably, the determination that the measured flow rate is inaccurate is further based on a comparison of a measured drive gain of the vibratory meter and a drive gain reference.

Preferably, the comparison between the drive gain and the drive gain reference comprises determining if the drive gain is more than a drive gain reference.

Preferably, the determination that the measured flow rate is inaccurate is further based on a comparison of the measured flow rate and a flow rate reference.

Preferably, the comparison between the measured flow rate and the flow rate reference comprises determining if the measured flow rate is less than a flow rate reference.

Preferably, the density change rate is calculated from the measured density.

According to an aspect, an apparatus (900) for detecting an inaccurate flow rate measurement by a vibratory meter (5) comprises an interface (901) configured to receive a measured flow rate and a measured density from the vibratory meter (5) and a processing system (910) communicatively coupled to the interface (901), the processing system (910) being configured to calculate a density change rate of the fluid and determine if the measured flow rate is inaccurate based on a comparison between the measured density and a density reference and a comparison between the density change rate and a density change rate reference.

Preferably, the processing system (910) is further configured to exclude the measured flow rate from a total flow calculation if the measured flow rate is inaccurate.

Preferably, the density reference is a density measured prior to the measurement of the density of the fluid in the vibratory meter (5).

Preferably, the comparison between the measured density and the density reference comprises determining if the measured density is less than the density reference.

Preferably, the comparison between the density change rate and the density change rate reference is comprised of determining if the density change rate is less than the density change rate reference.

Preferably, the processing system (910) is further configured to determine that the measured flow rate is inaccurate based on a comparison of a measured drive gain of the vibratory meter (5) and a drive gain reference.

Preferably, the comparison between the drive gain and the drive gain reference comprises determining if the drive gain is more than a drive gain reference.

Preferably, the processing system (910) is further configured to determine that the measured flow rate is inaccurate based on a comparison of the measured flow rate and a flow rate reference.

Preferably, the comparison between the measured flow rate and the flow rate reference comprises determining if the measured flow rate is less than a flow rate reference.

Preferably, the density change rate of the fluid is calculated from the measured density.

BRIEF DESCRIPTION OF THE DRAWINGS

The same reference number represents the same element on all drawings. It should be understood that the drawings are not necessarily to scale.

DETAILED DESCRIPTION

FIGS. 1-9 and the following description depict specific examples to teach those skilled in the art how to make and use the best mode of embodiments of detecting an inaccurate flow rate measurement by a vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of detecting the inaccurate flow rate measurement by the vibratory meter. As a result, the embodiments described below are not limited to the specific examples described below, but only by the claims and their equivalents.

Figure 1:
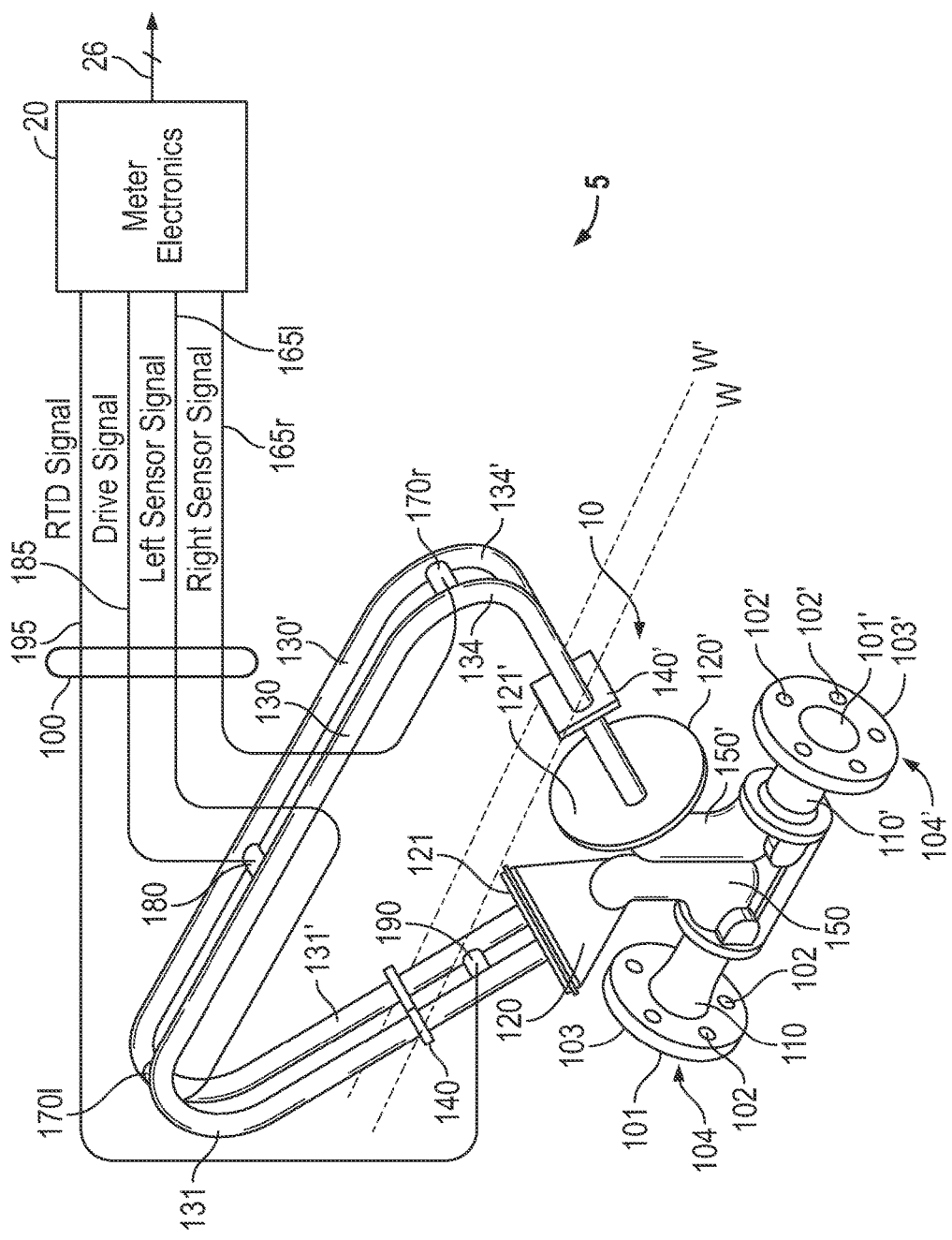
FIG. 1 shows a vibratory meter 5 comprising a meter assembly 10 and meter electronics 20.

FIG. 1 shows a vibratory meter 5 comprising a meter assembly 10 and meter electronics 20. The meter assembly 10 responds to mass flow rate and density of a process material. The meter electronics 20 is connected to the meter assembly 10 via leads 100 to provide density, mass flow rate, and temperature information over path 26, as well as other information. A Coriolis flow meter structure is described although it is apparent to those skilled in the art that the present invention could be practiced as a vibrating tube densitometer, tuning fork densitometer, or the like.

The meter assembly 10 includes a pair of manifolds 150 and 150', flanges 103 and 103' having flange necks 110 and 110', a pair of parallel flow tubes 130 and 130', drive mechanism 180, resistive temperature detector (RTD) 190, and a pair of pick-off sensors 170l and 170r. Flow tubes 130 and 130' have two essentially straight inlet legs 131, 131' and outlet legs 134, 134', which converge towards each other at flow tube mounting blocks 120 and 120'. The flow tubes 130, 130' bend at two symmetrical locations along their length and are essentially parallel throughout their length. Brace bars 140 and 140' serve to define the axis W and W' about which each flow tube 130, 130' oscillates. The legs 131, 131' and 134, 134' of the flow tubes 130, 130' are fixedly attached to flow tube mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the flow tube mounting block 120 having a surface 121. Within the manifold 150 the material is divided and routed through the flow tubes 130, 130'. Upon exiting the flow tubes 130, 130', the process material is recombined in a single stream within the mounting block 120' having a surface 121' and the manifold 150' and is thereafter routed to outlet end 104' connected by the flange 103' having holes 102' to the process line (not shown).

The flow tubes 130, 130' are selected and appropriately mounted to the flow tube mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the flow tubes change with temperature, and this change affects the calculation of flow and density, RTD 190 is mounted to flow tube 130' to continuously measure the temperature of the flow tube 130'. The temperature of the flow tube 130' and hence the voltage appearing across the RTD 190 for a given current passing therethrough is governed by the temperature of the material passing through the flow tube 130'. The temperature dependent voltage appearing across the RTD 190 is used in a well-known method by the meter electronics 20 to compensate for the change in elastic modulus of the flow tubes 130, 130' due to any changes in flow tube temperature. The RTD 190 is connected to the meter electronics 20 by lead 195.

Both of the flow tubes 130, 130' are driven by drive mechanism 180 in opposite directions about their respective bending axes W and W' and at what is termed the first out-of-phase bending mode of the flow meter. This drive mechanism 180 may comprise any one of many well-known arrangements, such as a magnet mounted to the flow tube 130' and an opposing coil mounted to the flow tube 130 and through which an alternating current is passed for vibrating both flow tubes 130, 130'. A suitable drive signal is applied by the meter electronics 20, via lead 185, to the drive mechanism 180.

The meter electronics 20 receives the RTD temperature signal on lead 195, and the left and right sensor signals appearing on leads 165l, 165r, respectively. The meter electronics 20 produces the drive signal appearing on lead 185 to drive mechanism 180 and vibrate tubes 130, 130'. The meter electronics 20 processes the left and right sensor signals and the RTD signal to compute the mass flow rate and the density of the material passing through meter assembly 10. This information, along with other information, is applied by meter electronics 20 over path 26.

The information sent over path 26 can be used to measure material characteristics such as flow rate, density, and temperature. Other measurements may also be made. These and other measurements can be employed to determine if a measurement is inaccurate. For example, a comparison between a measured density and a density reference and a comparison between a density change rate and a density change rate reference can determine if the measurement is inaccurate, as will be described in more detail in the following discussion of exemplary loading and unloading processes.

Loading Process

As described in the foregoing, batch applications are typically divided into a loading and an unloading process. In some embodiments, the loading and unloading of material, such as bunker fuel, are measured by the same vibratory meter. For example, a pump connected to a bunker on a dock may be coupled to a fuel port on the ship. A vibratory meter, such as a Coriolis flow meter, may be between the fuel port and one or more tanks on the tanker. During the loading process, the pump can pump fuel from the bunker through the vibratory meter into the tank. During unloading, a different pump at a different dock can pump the material out of the one or more tanks through the vibratory meter. Accordingly, the vibratory meter can calculate the total mass of the fuel transferred during each of the loading and unloading processes, as will be explained in more detail in the following.

Figure 2:
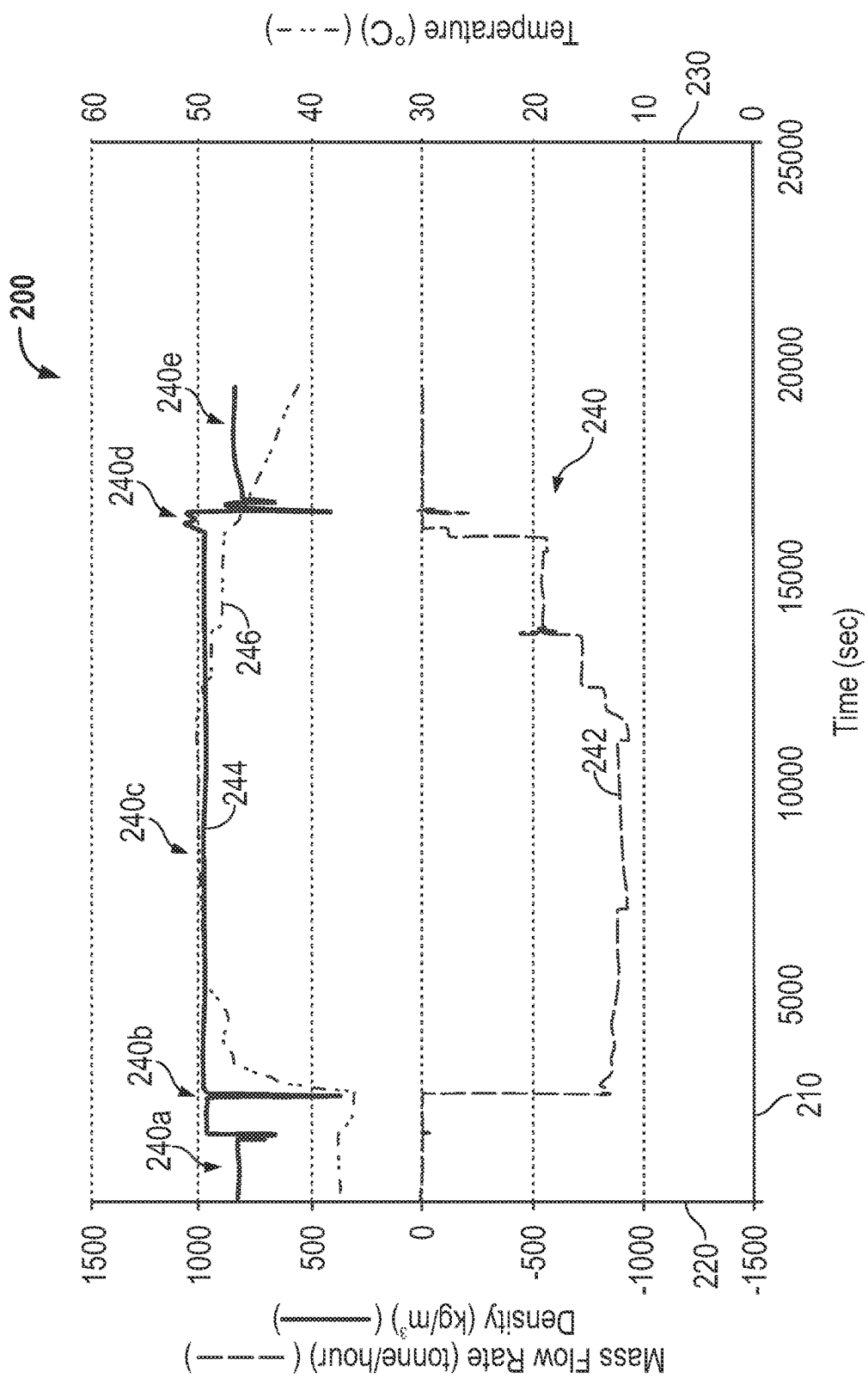
FIG. 2 shows a loading profile graph 200 illustrating measurements by a vibratory meter.

FIG. 2 shows a loading profile graph 200 illustrating measurements by a vibratory meter. The vibratory meter may be the vibratory meter 5 described in the foregoing with reference to FIG. 1. The loading profile graph 200 illustrates exemplary measurements obtained from the vibratory meter while bunker fuel is being loaded onto a tanker. However, in alternative embodiments, other profiles may be present. The loading profile graph 200 includes a time axis 210, a density/mass flow rate axis 220, and a temperature axis 230. The loading profile graph 200 also includes measurement plots 240. As shown in FIG. 2, the measurement plots 240 include a mass flow rate plot 242, a density plot 244, and a temperature plot 246.

The measurement plots 240 can be obtained in various flow conditions, including, for example, flow or no flow conditions. For example, during bunkering, the vibratory meter could be measuring fluid flow under no flow conditions because a valve on a dock is turned off. Also during bunkering, the vibratory meter could be measuring material flow that includes gases due to tanks being drained, or the like. The material flow can also include different components, such as entrained air, particulates, etc.

The different flow conditions can cause correspondingly different flow rate, density, drive gain, and other measurements. Accordingly, the measurement plots 240 can be divided into different segments with different characteristics due to the different flow conditions during each segment. In the embodiment shown in FIG. 2, the measurement plots 240 can be divided into several different segments that correspond to filling and draining the conduits in the vibratory meter. These different segments are illustrated in the measurement plots 240 by a filling segment 240a, a partially filled segment 240b, a material flow segment 240c, a draining segment 240d, and an empty segment 240e.

During the filling segment 240a, the material is beginning to fill the vibratory meter. As can be seen, the density plot 244 in the filling segment 240a is at about 800 kg/m$^3$. The mass flow rate plot 242 is at about zero due to the lack of material flow through the vibratory meter. In addition, since there is zero measured flow, the phase difference is at the zero offset. Therefore, it can be appreciated that the imbalanced condition described in the foregoing is not present. Following the filling segment 240a to the right, one can also observe that, as the conduits in the vibratory meter fills up with material, the density plot 244 begins to oscillate.

From the filling segment 240a to the partially filled segment 240b, the density reading increases from about 820 kg/m$^3$ to about 995 kg/m$^3$ as a result of gases or other fluids in the conduits being replaced by the material. However, there is no flow through the vibratory meter because the conduits are still filling. Because there is no flow through the vibratory meter, the mass flow rate plot 242 remains at zero. This is due to the lack of Coriolis forces that induces a phase difference between two sensors. Therefore, the filling process illustrated by the filling segment 240a and the partially filled segment 240b does not contribute to the calculated total flow through the vibratory meter. After the vibratory meter is filled, the fuel can begin flowing through the vibratory meter, which is illustrated by the material flow segment 240c.

At the beginning of the material flow segment 240c, the density plot 244 oscillates and then settles at about 995 kg/m$^3$. The oscillation in the density plot 244 can be due to slug flow. The slugs may be present due to gases being trapped in the conduits while the vibratory meter was being filled. When the material begins to flow, the trapped gases move through the vibratory meter, causing a perturbation in the density reading. Also, due to the material flow through the vibratory meter, the flow rate decreases from 0 to about −800 metric tons per hour. The flow rate is negative because the material is flowing in reverse through the vibratory meter. Accordingly, the magnitude of the measured reverse flow is the flow rate of the material. As can also be seen in FIG. 2, the temperature plot 246 increases at the beginning of the material flow segment 240c. During the material flow segment 240c, the mass flow rate plot 242, density plot 244, and temperature plot 246 stabilize to about 1000 kg/m$^3$, 800 metric tons per hour, and 50° C., respectively, at about 5000 seconds.

Moving further to the right of the material flow segment 240c, the density plot 244 remains steady while the magnitude of the mass flow rate plot 242 begins to drop. The drop in the mass flow rate plot 242 can be due to a valve being closed to reduce the flow rate. More specifically, beginning at about 13000 seconds, there are a series of steps in the mass flow rate plot 242. However, the density plot 244 remains constant as the magnitude of the mass flow rate plot 242 drops. Accordingly, one can appreciate that, since the density plot 244 is steady, the corresponding portions of the mass flow rate plot 242 may be accurate flow rate measurements. At about 13500 seconds and near the end of the material flow segment 240c, the mass flow rate plot 242 decreases from about 800 metric tons per hour to about 550 metric tons per hour.

After the fuel flow is shut off due to, for example, a valve on the dock being closed, the vibratory meter begins to drain. In the embodiment shown in FIG. 2, the draining segment 240d begins about 16000 seconds, and the magnitude of the mass flow rate plot 242 decreases from about 550 metric tons per hour to zero metric tons per hour. While the magnitude of the mass flow rate plot 242 drops to zero, the density plot 244 oscillates but remains greater than zero. The density plot 244 can oscillate due to, for example, slug flow and properties of the material in the vibratory meter. The temperature plot 246 also drops and begins trending towards about 38 degrees.

The empty segment 240e, which begins about 16500 seconds, shows that when the vibratory meter is emptied, the density plot 244 trends to about 820 kg/m$^3$, which is about the same as the measurement at the beginning of the loading process. The magnitude of the mass flow rate plot 242 remains at zero although there is a perturbation at about 16500 seconds between the draining segment 240d and the empty segment 240e. Accordingly, the mass flow rate plot 242 during the empty segment 240e does not contribute to the calculated total mass flow through the vibratory meter. In addition, it can be appreciated that the imbalanced condition that leads to inaccurate measurements is not present during the empty segment 240e.

Although the mass flow rate plot 242, the density plot 244, and the temperature plot 246 can provide significant information about the flow conditions of the material in the vibratory meter, additional information about the flow conditions may be obtained by, for example, measuring the drive gain. Exemplary drive gain measurements are therefore discussed in more detail in the following, although any other suitable measurements, such as, for example, pick-off voltage, may be employed in alternative embodiments.

Figure 3:
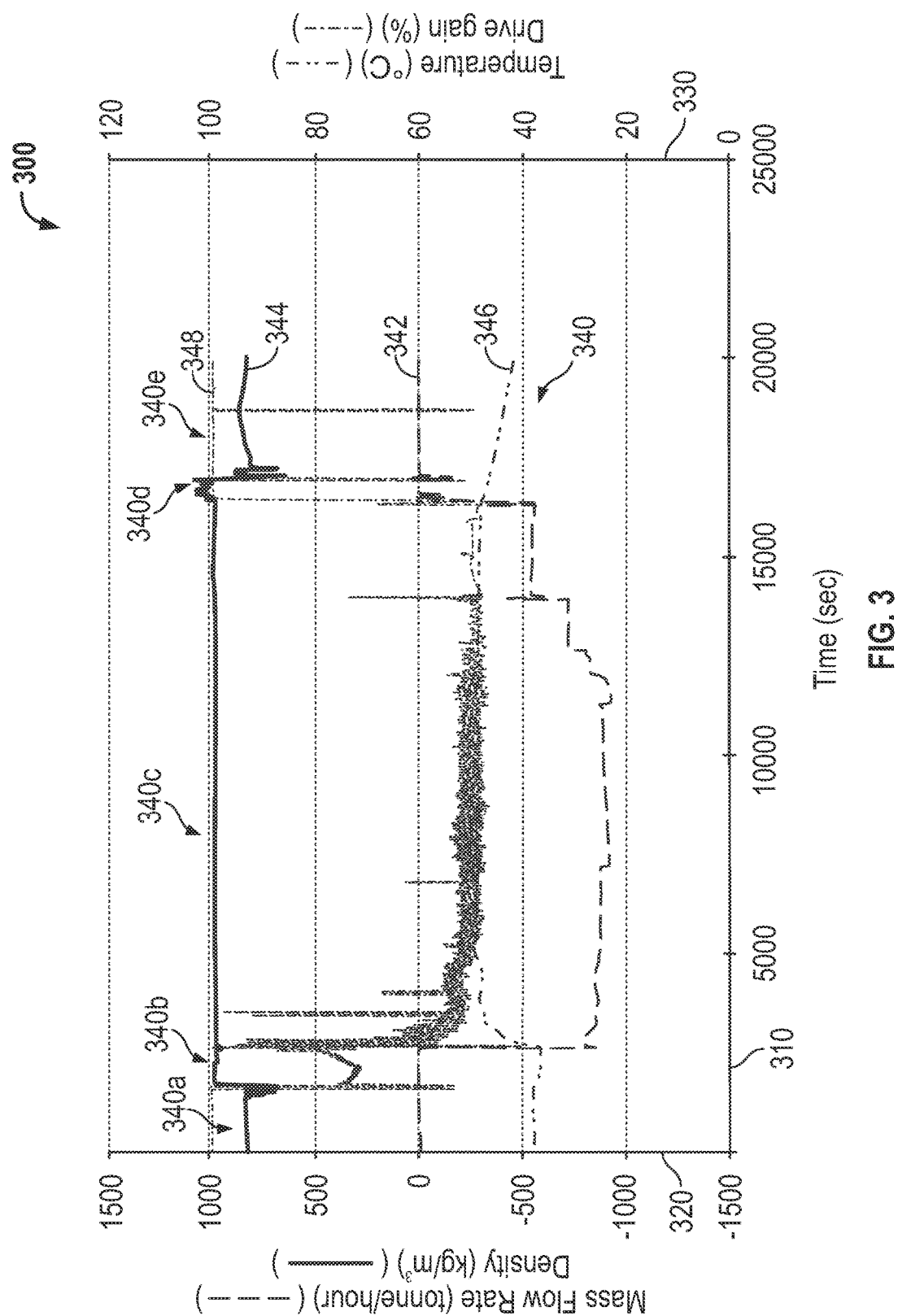
FIG. 3 shows another loading profile graph 300 illustrating a drive gain measurement in addition to the measurements shown in FIG. 2.

FIG. 3 shows another loading profile graph 300 illustrating a drive gain measurement in addition to the measurements shown in FIG. 2. The loading profile graph 300 includes a time axis 310, a density/mass flow rate axis 320, and a temperature/drive gain axis 330. The loading profile graph 300 also includes measurement plots 340. As shown in FIG. 3, the measurement plots 340 include a mass flow rate plot 342, a density plot 344, and a temperature plot 346, which respectively correspond to the mass flow rate plot 242, the density plot 244, and the temperature plot 246 shown in FIG. 2. The segments 240a-240e described with reference to FIG. 2 are also shown in FIG. 3 as a filling segment 340a, a partially filled segment 340b, a material flow segment 340c, a draining segment 340d, and an empty segment 340e. Also shown in FIG. 3 is a drive gain plot 348 illustrating the changes in the drive gain during the loading process.

As can be seen from FIGS. 2 and 3, the density plot 244, 344 is nearly constant during a significant portion of the loading process. The density plot 244, 344 changes when there is slug flow or entrained gas flow through the vibratory meter. The mass flow rate plot 242, 342 is similarly constant. Accordingly, the total flow through the vibratory meter may be calculated from the flow rate shown by the mass flow rate plot 242, 342. The calculation may be comprised of, for example, integrating the mass flow rate plot 242, 342 shown in FIGS. 2 and 3. However, alternative calculation methods may be employed in other embodiments.

The drive gain plot 348 begins with the gain at approximately 100%. The drive gain plot 348 remaining at approximately 100% until the mass flow rate plot 242, 342 indicates that the material is flowing through the vibratory meter. During the material flow segment 340c, the drive gain plot 348 is generally less than 60%. The drive gain plot 348 may be below 60% due to the conduits vibrating at a resonant frequency. When the vibratory meter is draining or empty, the drive gain increases to approximately 100% with some perturbations that drop to less than 60%.

It can be appreciated that the drive gain plot 348 can indicate an empty or partially filled condition in the conduits. Accordingly, an imbalanced condition in the flow meter may be indicated when the drive gain plot 348 is greater than, for example, 85%. However, even during the material flow segment 340*c*, the drive gain plot 348 includes perturbations that are greater than 85%. Accordingly, the perturbations in the drive gain plot 348 may also indicate conditions associated with, for example, slug flow or the like, but cannot be the imbalanced condition described in the foregoing because the perturbations occur during a flow condition.

The foregoing discusses the loading process and corresponding flow conditions. As can be appreciated, the unloading process may result in flow conditions that are different than the flow conditions present during the loading process. For example, the unloading process can experience more slug or entrained gas flows than the loading process. In addition, the unloading process may include a zero stop segment, which is where the pump is turned off while pumping fuel from the tank. These two conditions can create the imbalanced flow condition that leads to inaccurate mass flow rate measurements. An exemplary unloading process is discussed in the following.

Unloading Process

Figure 4:
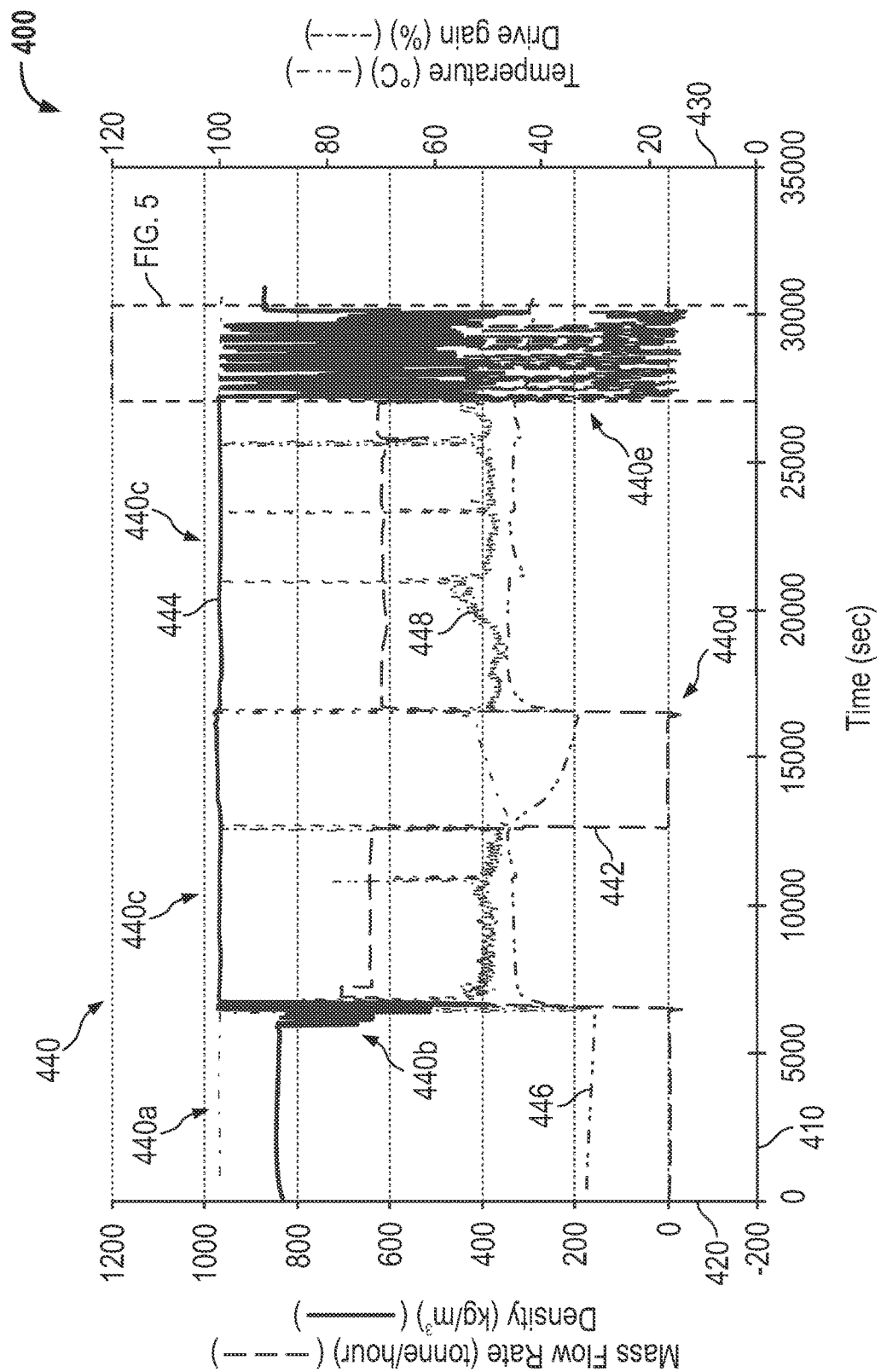
FIG. 4 shows an unloading profile graph 400 illustrating measurements by a vibratory meter.

FIG. 4 shows an unloading profile graph 400 illustrating measurements by a vibratory meter. The vibratory meter used to create the loading profile graphs 200, 300 described in the foregoing was used to create that unloading profile graph 400 shown in FIG. 4. However, in alternative embodiments, a first vibratory meter may be employed to load fuel into a tank and a second vibratory meter may be used to unload the fuel from the tank. Other arrangements may also be employed.

The unloading profile graph 400 includes a time axis 410, a density/mass flow rate 420, and a temperature/drive gain axis 430. The unloading profile graph 400 also includes measurement plots 440. As shown in FIG. 4, the measurement plots 440 include a mass flow rate plot 442, a density plot 444, a temperature plot 446, and a drive gain plot 448. In a manner similar to the loading process described in the foregoing, the unloading process can be divided into several segments.

In the embodiment shown in FIG. 4, the unloading process can be divided into an empty segment 440*a*, a partially filled segment 440*b*, a material flow segment 440*c*, which is divided by a stop segment 440*d*, and a tank-stripping/line-clearing segment 440*e*, which is described with reference to FIG. 5. These segments correspond to flowing material, such as bunker fuel, from a tank to an initially empty vibratory meter, filling the vibratory meter, and draining the tank through the vibratory meter. Accordingly, the unloading process begins with the empty segment 440*a*.

The empty segment 440*a* is a flow condition where the vibratory meter is not filled with material. During the empty segment 440*a*, the material is flowed out of the tank and into a line that is coupled to the vibratory meter. The density plot 444 remains constant at about 800 kg/m³. The mass flow rate plot 442 is zero and does not have any perturbations. The temperature plot 446 is about 32° C. and the drive gain plot 448 is approximately 100%.

At the beginning of the partially filled segment 440*b*, which is about 6000 seconds, the density plot 444 begins to oscillate, but the mass flow rate plot 442 remains zero. After the vibratory meter fills and the material begins to flow, the density plot 444 oscillates and then increases from about 800 kg/m³ to about 995 kg/m³ at about 6800 seconds. However, because there is no flow through the vibratory meter, the mass flow rate plot 442 remains at zero. This is due to the lack of Coriolis forces that induces a phase difference between two sensors. Therefore, flow rate measurements made during the partially filled segment 440*b* may not contribute to the calculated total flow through the vibratory meter. After the vibratory meter is filled, the material can begin flowing through the vibratory meter.

During the material flow segment 440*c*, the density plot 444 is at about 995 kg/m³. As can be appreciated, the density plot 444 is also relatively stable during the material flow segment 440*c*. The mass flow rate plot 442 increases from about 0 to about 650 metric tons per hour. The temperature plot 446 increases from about 32° C. to about 48° C. The drive gain plot 448 decreases to about 50% with a perturbation that is about 80% at about 10500 seconds.

At about 12500 seconds, the material flow segment 440*c* is interrupted by the stop segment 440*d*. The stop segment 440*d* is characterized by the density plot 444 remaining constant and the magnitude of the mass flow rate plot 442 dropping to zero metric tons per hour. The temperature plot 446 trends to about 32° C. and the drive gain plot 448 increases with a substantially constant slope to about 55%. At about 16500 seconds, the stop segment 440*d* ends and the material flow segment 440*c* resumes.

During the material flow segment 440*c* from about 16500 seconds to about 27000 seconds, the mass flow rate plot 442 and the density plot 444 are substantially constant. The values of the mass flow rate plot 442 and the density plot 444 are also substantially the same as during the material flow segment 440*c* prior to the stop segment 440*d*. In addition, there are several perturbations in the drive gain plot 448. During these perturbations, the mass flow rate plot 442 either remains constant or drops. The material flow segment 440*c* ends about when the tank is substantially drained.

Accordingly, the unloading profile graph 400 also includes a tank-stripping/line-clearing segment 440*e*, which is described in more detail with reference to FIG. 5. The tank-stripping/line-clearing segment 440*e* occurs when the one or more tanks and lines on the tanker are drained of residual fuel. As can be appreciated, the tank-stripping/line-clearing segment 440*e* typically involves intermittent material flow such as, for example, a relatively rapid sequence of fuel flow with intervening gaps of air. As a result, the tank-stripping/line-clearing segment 440*e* shows rapid oscillations in the density and flow rate of the material.

As can be seen in FIG. 4, the density plot 444 is nearly constant during a significant portion of the unloading process. As can also be appreciated by comparing FIG. 4 with FIGS. 2 and 3, the density measurements are approximately the same under similar flow conditions. However, in contrast to the exemplary loading process described in the foregoing with reference to FIGS. 2 and 3, the unloading process illustrated by FIG. 4 induces oscillations in the mass flow rate plot 442. These oscillations may include flow rates that are non-zero and may therefore contribute to the calculation of the total material flow through the vibratory meter.

With reference to the foregoing description of various flow conditions during the exemplary batch processes, the following will describe embodiments that detect inaccurate flow rate measurements. For example, the following will describe how the density measurements can be used to determine if a corresponding flow rate measurement is an inaccurate measurement. The method of detecting the inaccurate flow rate measurement can also rely on other measurements by the vibratory meter. The following description begins by discussing exemplary accurate flow rate measurements with reference to FIG. 5 and then turning to inaccurate flow rate measurements shown in FIG. 6.

Exemplary Accurate Flow Rate Measurements

Figure 5:
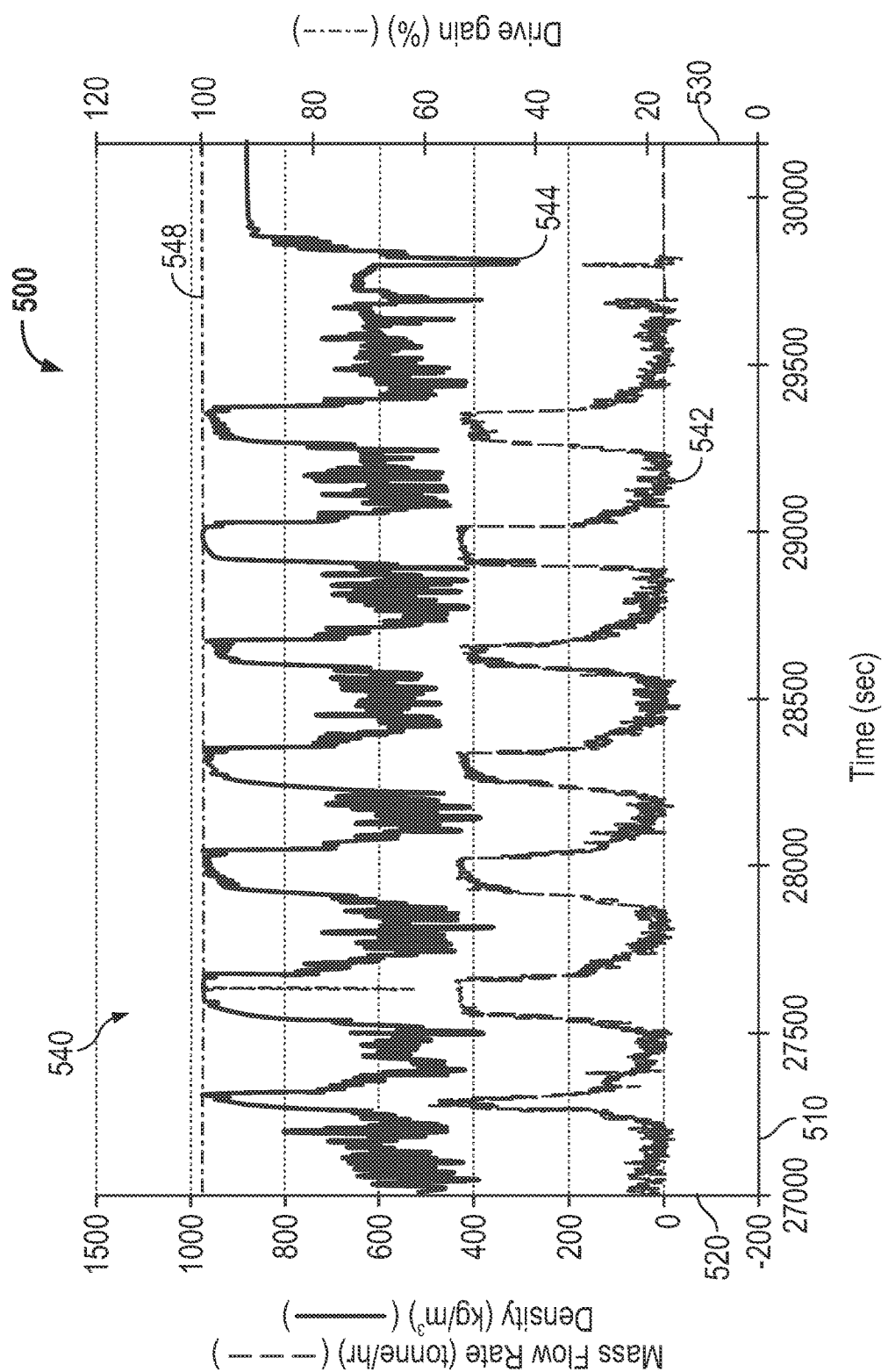
FIG. 5 shows an enlarged unloading graph 500 illustrating the tank-stripping/line-clearing segment 440e shown in the unloading profile graph 400.

FIG. 5 shows an enlarged unloading graph 500 illustrating the tank-stripping/line-clearing segment 440e shown in the unloading profile graph 400. The enlarged unloading graph 500 includes a time axis 510, a density/mass flow rate axis 520, and a drive gain axis 530. The enlarged unloading graph also includes measurement plots 540. The measurement plots 540 include a mass flow rate plot 542, a density plot 544, and a drive gain plot 548.

As can be seen in FIG. 5, the density plot 544 corresponds with the mass flow rate plot 542. For example, when the density plot 544 drops, there is typically slug flow through the vibratory meter. The mass flow rate plot 542 also drops and, in particular, drops to about zero. As can be appreciated, the mass flow rate plot 542 dropping to zero about when there is slug flow through the vibratory meter indicates that the mass flow rate measurements during the tank-stripping/line-clearing segment 440e are accurate and should be included in the calculation of the total material flow through the vibratory meter.

In addition, the drive gain plot 548 remains substantially constant with the exception of a transient drop that has a short duration. The drive gain plot 548 remaining constant even though there are oscillations in the mass flow rate plot 542 and the density plot 544 can also indicate that the mass flow rate measurements shown in FIG. 5 are accurate.

Accordingly, it can be appreciated that the flow meter can accurately measure the flow rate of the material through the vibratory meter during the tank-stripping/line-clearing segment 440e. However, other unloading segments can induce inaccurate flow rate measurements, which can be detected, as will be described in the following with reference to an embodiment shown in FIG. 6.

Exemplary Inaccurate Flow Rate Measurements

Figure 6:
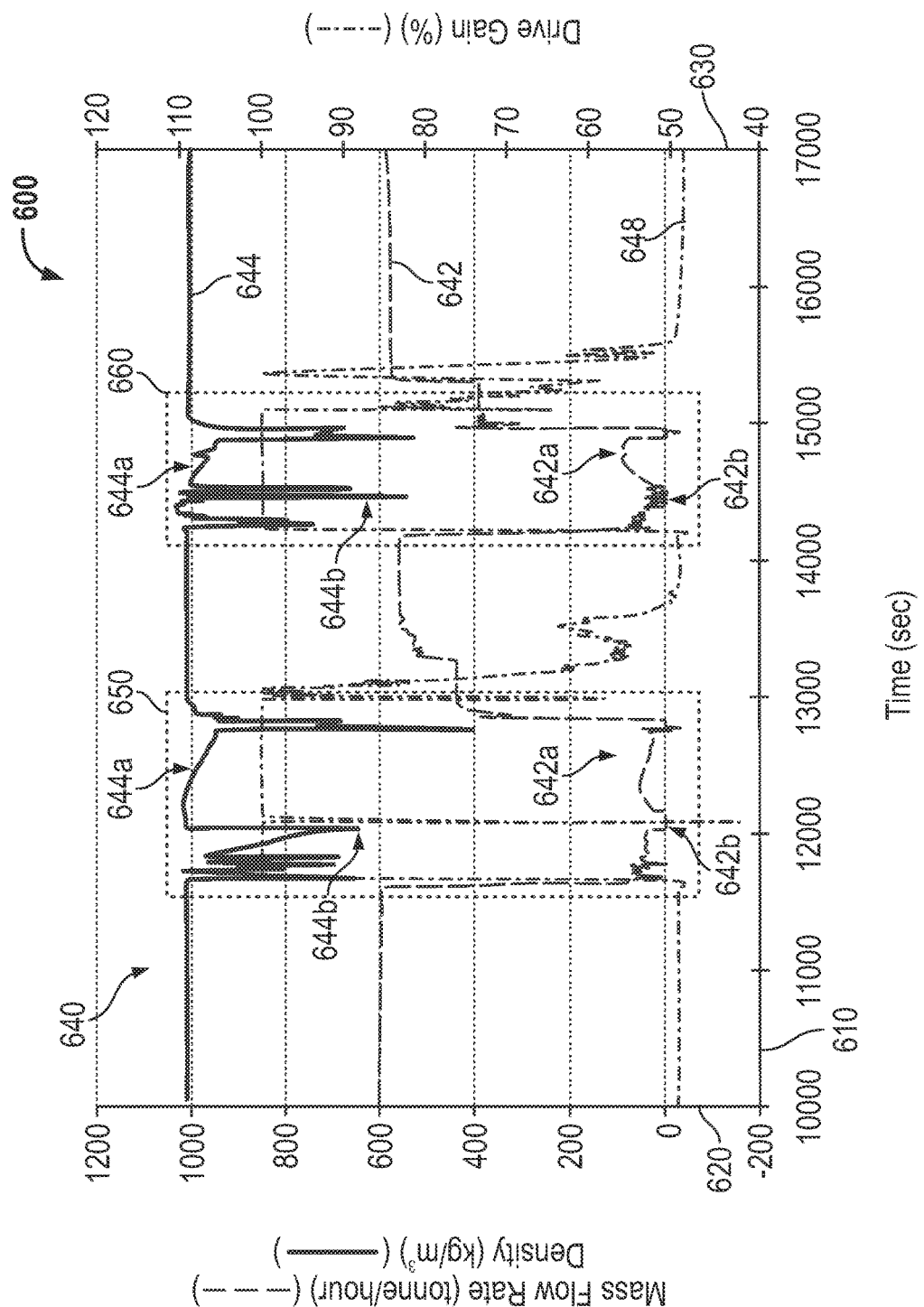
FIG. 6 shows an unloading stop graph 600 illustrating the changes in density and flow rate measurements during a full stop segment.

FIG. 6 shows an unloading stop graph 600 illustrating the changes in density and flow rate measurements during a full stop segment. The unloading stop graph 600 has a time axis 610, a density/mass flow rate axis 620, and a drive gain axis 630. The unloading stop graph 600 also includes measurement plots 640. The measurement plots 640 include a mass flow rate plot 642, a density plot 644, and a drive gain plot 648.

The unloading stop graph 600 includes a first stop segment 650 and a second stop segment 660. Within each of the first and second stop segment 650, 660 is a sloped density measurement 644a and an inaccurate flow rate measurement 642a. Also shown in each of the first and second stop segment 650, 660 is a zero flow density measurement 644b and a zero flow rate measurement 642b.

The zero flow rate measurement 642b is the segment of the mass flow rate plot 642 that is about zero metric tons per hour. In contrast, the inaccurate flow rate measurement 642a is more than zero. The inaccurate flow rate measurement 642a is also occurring when the vibratory meter is in stop flow condition. Accordingly, the actual material flow through the vibratory meter is zero although the vibratory meter is measuring a flow rate. The inaccurate flow rate measurement 642a is likely due to imbalanced flow tubes or other conditions that do not correspond to actual material flow through the vibratory meter.

As can be appreciated, the sloped density measurement 644a corresponds to the inaccurate flow rate measurement 642a and has a non-zero slope. Also, the density change rate in the sloped density measurement 644a is less than the density change rate of the zero flow density measurement 644b. Therefore, comparing the density change rate of density plot 644 to a density change rate reference can identify an inaccurate measurement by the vibratory meter. For example, if a comparison shows that the density change rate of the sloped density measurement 644a is less than the density change rate that corresponds to the zero flow rate measurement 642b, then the inaccurate flow rate measurement 642a may be excluded from the total flow through the flow meter. Other density change rate references can be employed in other embodiments.

As the foregoing illustrates, the inaccurate flow rate measurement 642a can be detected by comparing a density change rate of the density plot 644 with a density change rate reference. In an exemplary embodiment, the density change rate of the density plot 644 may be compared with a scalar value that is set by the user. The scalar value may be a maximum value. In this embodiment, if the density change rate of the density plot 644 is less than the density change rate reference, then the corresponding flow rate measurement 642a may be inaccurate. These and other methods for detecting an inaccurate flow rate measurement are described in more detail in the following.

Figure 7:
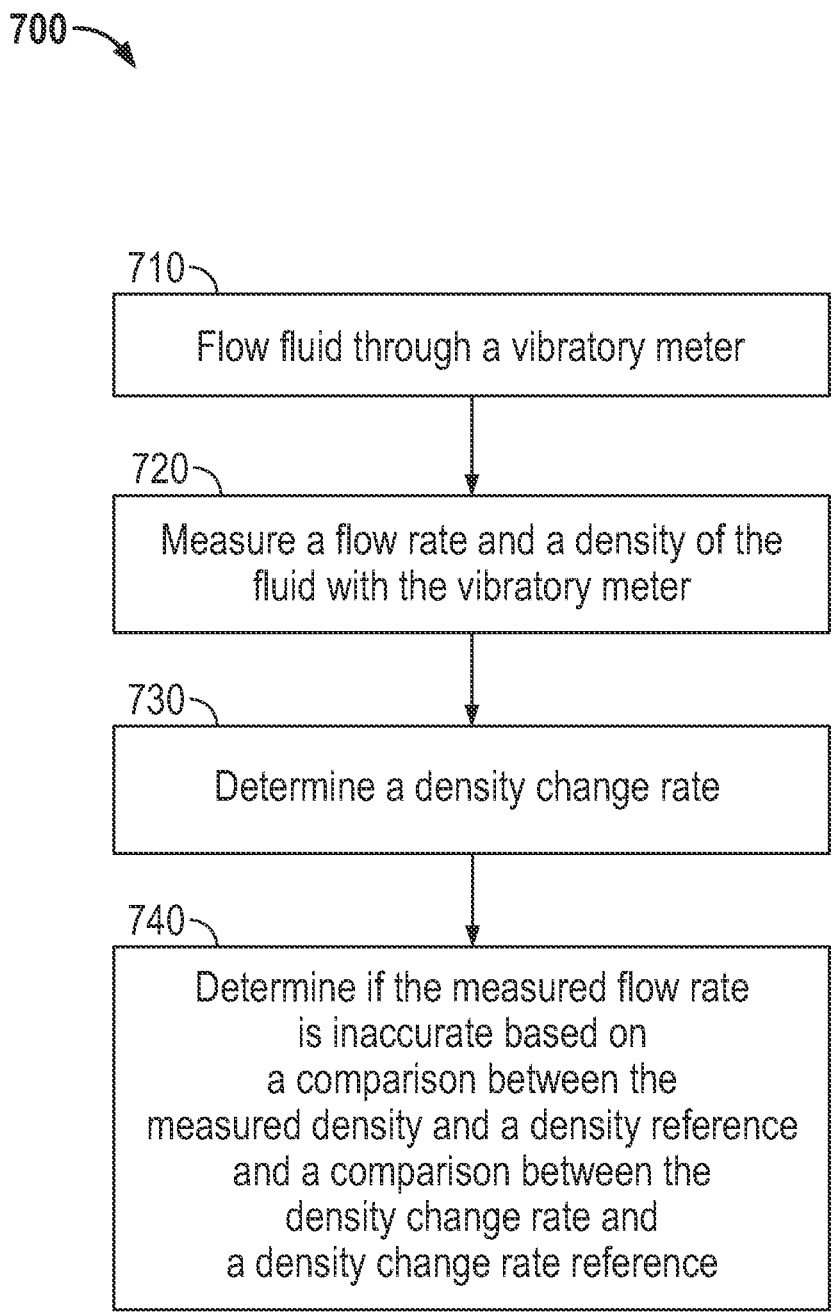
FIG. 7 shows a method 700 for detecting an inaccurate flow rate measurement according to an embodiment.

FIG. 7 shows a method 700 for detecting an inaccurate flow rate measurement according to an embodiment. The method 700 begins by flowing fluid through a vibratory meter in step 710. The vibratory meter may be the vibratory meter 5 described with reference to FIG. 1, although any appropriate vibratory meter may be employed in alternative embodiments. In step 720, the method 700 measures a flow rate and a density of the fluid with the vibratory meter. In the embodiment shown, the flow rate could be a mass flow rate although any suitable flow rate can be employed in alternative embodiments. In step 730, the method 700 determines a density change rate from the measured density. The density change rate can be determined in various ways, such as, for example, a moving average of prior measurements of a sample size, or the like.

Figure 8:
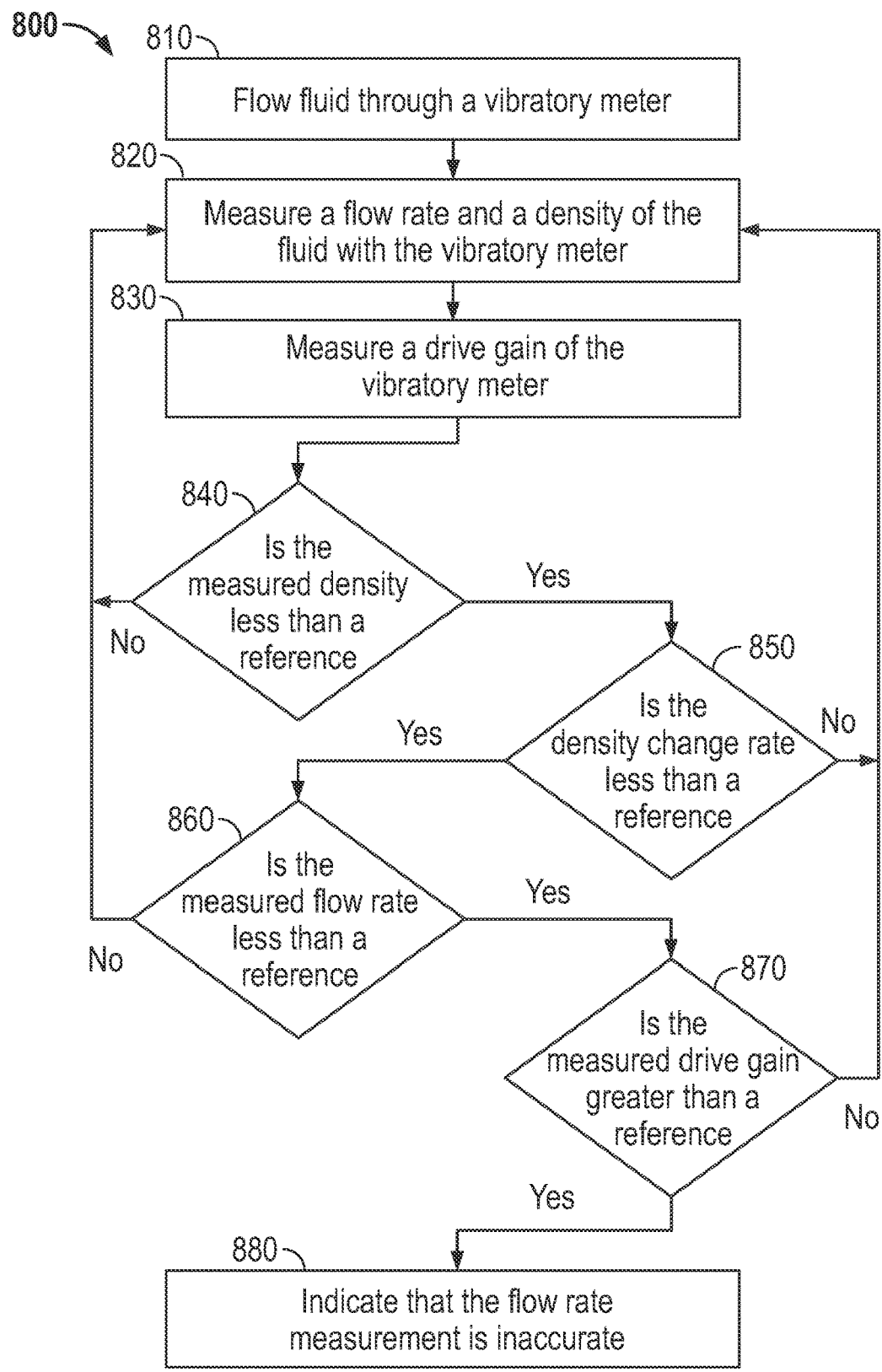
FIG. 8 shows a method 800 for detecting an inaccurate flow rate measurement according to an embodiment.

FIG. 8 shows a method 800 for detecting an inaccurate flow rate measurement according to an embodiment. The method 800 begins by flowing fluid through a vibratory meter in step 810. The vibratory meter may be the vibratory meter 5 described in the foregoing with reference to FIG. 1. In step 820, the method 800 measures a flow rate and a density of the fluid with the vibratory meter. The flow rate can be a mass flow rate although any suitable flow rate can be employed in alternative embodiments. In step 830, the method 800 measures a drive gain of the vibratory meter. In steps 840 through 880, the method 800 compares measurements with references to determine if a measurement by the vibratory meter is inaccurate. If all the comparisons made in steps 840-880 are true, then the flow rate measurement is indicated as inaccurate in step 880.

As shown in FIG. 8, the method 800 compares the measured density, a density change rate of the measured density, the measured flow rate, and the measured drive gain with corresponding references. In step 840, the method 800 compares the measured density with a density reference. In particular, the method 800 determines if the measured density is less than the density reference. The density reference can be a predetermined density reference. For example, with reference to the embodiments shown in FIGS. 1-6, the density reference may be 950 kg/m$^3$. The density reference of 950 kg/m$^3$ can be chosen to ensure that the measured flow rates that correspond to density measurements greater than 950 kg/m$^3$ are added to the calculated total material flow through the vibratory meter.

In step 850, a density change rate of the measurements is compared with a density change rate reference. For example, if the density change rate is less than the density change rate reference, then the method 800 proceeds to step 860. The density change rate reference can be a predetermined density change rate reference. For example, with reference to the embodiments shown in FIGS. 1-6, the density change rate reference may be 10 kg/m$^3$ per sec. Accordingly, if the density measurement is less than the density reference and the density change rate is less than the density change rate reference, then the method 800 continues to step 860.

In step 860, the method 800 compares the measured flow rate with a flow rate reference. In particular, if the measured flow rate is less than the flow rate reference, then the method 800 continues to step 870. The flow rate reference can be a predetermined reference. For example, with reference to the embodiments shown in FIGS. 1-6, the flow rate reference can be 100 metric tons per hour. Accordingly, if the density measurement is less than the density reference, the density change rate of the measured density is less than the density change rate reference, and the measured flow rate is less than the flow rate reference, then the method 800 continues to step 870.

In step 870, the method 800 compares the measured drive gain with a drive gain reference. In particular, the method 800 determines if the measured drive gain is greater than the drive gain reference. For example, with reference to the embodiments shown in FIGS. 1-6, the drive gain reference may be 85%. Accordingly, if the density measurement is less than the density reference, the density change rate is less than the density change rate reference, the measured flow rate is less than the flow rate reference, and the measured drive gain is greater than the drive gain reference, then the method 800 continues to step 880.

In step 880, the method 800 indicates that the flow rate measurement is inaccurate. The flow rate measurement may be the same flow rate that was measured in step 820. That is, the flow rate, density, and drive gain may be measured at approximately the same time. However, in alternative embodiments, the flow rate, density, and drive gain that are measured in steps 820-830 may correspond in other ways (e.g., measurement time delay). As shown in FIG. 8, the measured density, measured flow rate, and measured drive gain correspond with each other by being measured at approximately the same time.

The flow rate measurement can be indicated as being inaccurate in various ways. For example, the flow rate measurement stored in meter electronics could have an additional bit that is flipped to zero when steps 840-870 indicate that the flow rate measurement is inaccurate. That is, the flow rate measurement could be stored with a default 'accurate' flag comprising, for example, a value of one. When the method 800 indicates that the flow rate measurement is inaccurate, the bit may be flipped to zero. Accordingly, the inaccurate flow rate measurement is not subsequently added to the total flow rate through the vibratory meter. Alternative embodiments may employ other methods to indicate that the flow rate measurement is inaccurate, which may be executed on the meter electronics 20 described with reference to FIG. 1. An exemplary meter electronics 20 is described in the following.

Figure 9:
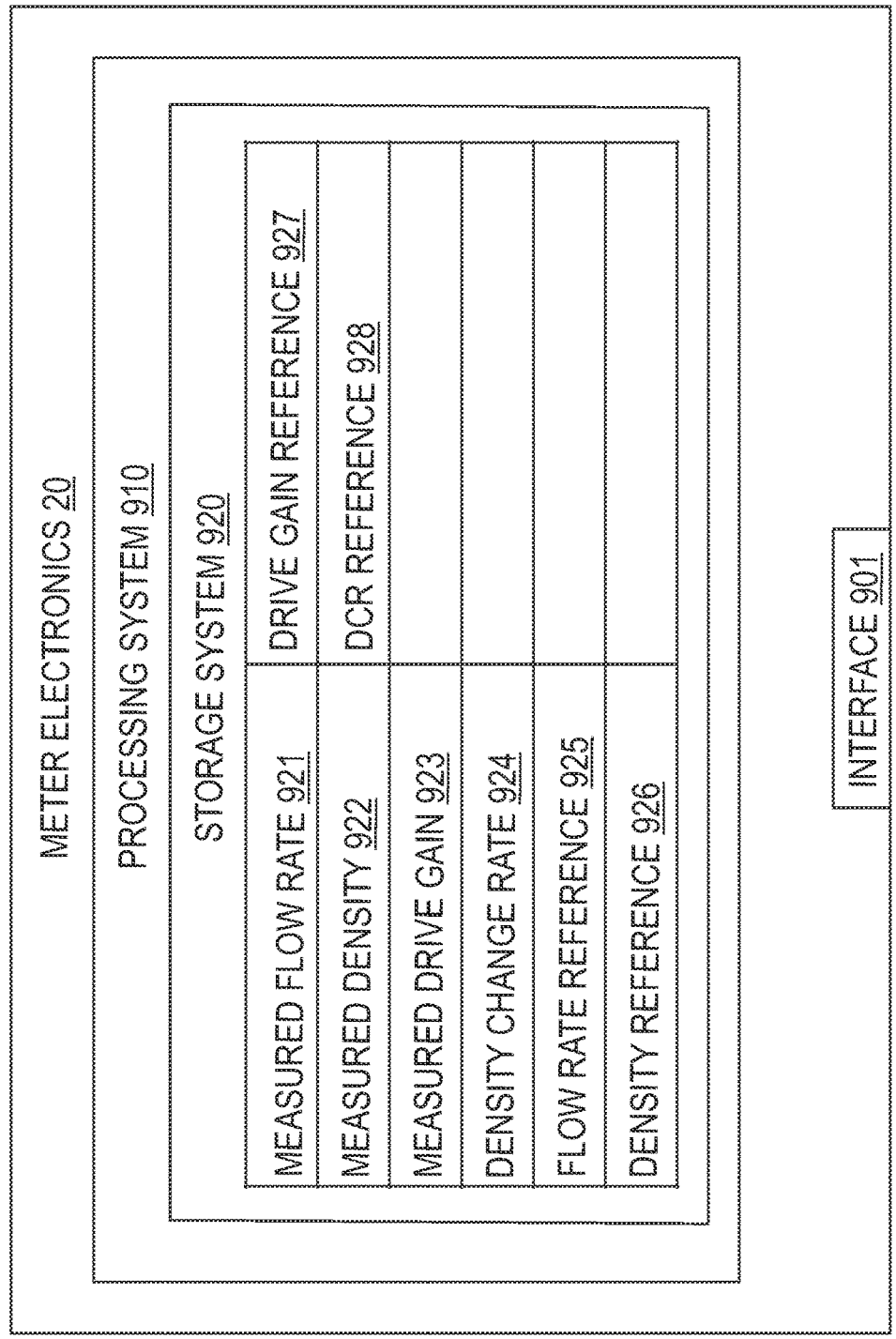
FIG. 9 shows an apparatus 900 for detecting an inaccurate flow rate measurement by a vibratory meter.

FIG. 9 shows an apparatus 900 for detecting an inaccurate flow rate measurement by a vibratory meter. In the embodiment shown in FIG. 9, the apparatus 900 is comprised of the meter electronics 20 described in the foregoing with reference to FIG. 1. The meter electronics 20 can include an interface 901 and a processing system 910. The processing system 910 may include a storage system 920. The storage system 920 may comprise an internal memory as shown, or alternatively, may comprise an external memory.

The interface 901 can receive the sensor signals from the drive mechanism 180 and pick-off sensors 170*l*, 170*r* via leads 165*r*, 165*l*, 185. The interface 901 may perform any necessary or desired signal conditioning, such as any manner of formatting, amplification, buffering, etc. Alternatively, some or all of the signal conditioning can be performed in the processing system 910. In addition, the interface 901 can enable communications between the meter electronics 20 and external devices. The interface 901 can be capable of any manner of electronic, optical, or wireless communication.

The interface 901, in an embodiment, may include a digitizer, wherein the sensor signal comprises an analog signal. The digitizer can sample and digitize the analog signal and produce a digital signal. The digitizer can also perform any needed decimation, wherein the digital signal is decimated in order to reduce the amount of signal processing needed and to reduce the processing time.

The processing system 910 can comprise a general purpose computer, a micro-processing system, a logic circuit, or some other general purpose or customized processing device. The processing system 910 can be distributed among multiple processing devices. The processing system 910 can include any manner of integral or independent electronic storage medium, such as the storage system 920.

It should be understood that the meter electronics 20 may include various other components and functions that are generally known in the art. These additional features are omitted from the description and the figures for the purpose of brevity. Therefore, the present invention should not be limited to the specific embodiments shown and discussed.

The meter electronics 20 can use the stored drive signal to generate and supply the drive signal sent over the lead 185 to the drive mechanism 180. For example, the drive signal described with reference to FIG. 1 could be generated from the stored drive signal with a digital-to-analog converter. In addition, the meter electronics 20 can receive, encode, and store the sensor signals received over the leads 165*l*, 165*r* into the stored sensor signals. In some embodiments, the sensor signals can include signals received from the drive mechanism 180. The meter electronics 20 may also receive, encode, and store the RTD signal from the RTD 190 as an RTD signal (not shown), which is coupled to the flow tubes 130, 130'. The meter electronics 20 can process the sensor signals in order to obtain flow characteristics of the material flowing through the flow tubes 130, 130'.

The meter electronics 20 can receive and store the measured flow rate 921, a measured density 922, and a measured drive gain 923. The measured flow rate 921, measured density 922, and measured drive gain 923 can be received via the interface 901 and stored in the storage system 920 as shown in FIG. 9. The measured flow rate 921, measured density 922, and measured drive gain 923 can be stored as a digital value with associated date such as a measurement time stamp, validity bit, etc.

The meter electronics 20 can also calculate a density change rate reference 928. The density change rate reference 928 can be calculated by storing a time based series of the measured density 922 with a predetermined sample size. The difference between each of the time based series of the measured density 922 can be summed and divided by the number of differences. The sample size can be one or more. For example, a density measurement that is received via the interface 901 can be subtracted from the measured density 922 that is stored in the storage system 920. The result can be stored as the density change rate 924.

In the embodiment shown in FIG. 9, the meter electronics 20 can process the measured flow rate 921, measured density 922, and measured drive gain 923. For example, with reference to the foregoing described embodiments, the meter electronics 20 can receive and store the measured flow rate 921, measured density 922, and measured drive gain 923 from the meter assembly 10 through the interface 901. The meter electronics 20 can also compare the measured flow rate 921, measured density 922, and measured drive gain 923 with references using the method 800 described in the foregoing.

For example, the meter electronics 20 can compare the measured flow rate 921 with a flow rate reference 925. Similarly, the meter electronics 20 can compare the measured density 922 with the density reference 926 and the measured drive gain 923 with a drive gain reference 927. The comparison can be performed by the processing system 910 with the method 800 described with reference to FIG. 8 although alternative methods can be performed by the meter electronics 20.

The density reference 926 and the drive gain reference 927 can be predetermined. That is, the density reference 926 and the drive gain reference 927 can be input by the user, determined by an algorithm, or the like, prior to the measurement of the flow rate, density, and drive gain. However, alternative embodiments can employ various other methods to determine and store the references 925-928. For example, a table with fuel types and correlated references could be stored in the meter electronics 20. The user could input the fuel type into the meter electronics 20 through a user interface. The meter electronics 20 could the read the correlated references 925-928 from the storage system 920.

By comparing the measurements 921-924 with the references 925-928, the meter electronics 20 can determine if the measured flow rate 921 is an inaccurate measurement. For example, the method 800 can determine if the measured flow rate 921 is less than the flow rate reference 925, the measured density 922 is less than the density reference 926, the measured drive gain 923 is greater than the drive gain reference 927, and the density change rate 924 is less than the density change rate reference 928. If the foregoing comparisons are true, then the meter electronics 20 could exclude the measured flow rate 921 from a total flow calculation.

The meter electronics 20 may also calculate the total flow. For example, the meter electronics 20 could integrate a time based series of the measured flow rates over the period of the loading or unloading process. Other methods can be employed in alternative embodiments.

The embodiments described above provide a method 700, 800 and an apparatus 900 for detecting an inaccurate flow rate measurement by a vibratory meter. As explained in the foregoing, the method 700, 800 and apparatus 900 for detecting the inaccurate flow rate measurement by the vibratory meter may compare measurements with references. The comparison can indicate whether a flow rate measurement is inaccurate. If the flow rate measurement is inaccurate, then the flow rate measurement is not included in a total flow calculation.

Accordingly, the total flow calculation does not include inaccurate flow rate measurements. In batch applications with loading and unloading processes, the measurements can be the same or within a mutually agreed tolerance. In addition, since the comparisons may be done within the meter electronics 20, additional measurement verification devices are not needed.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other methods and apparatuses of detecting an inaccurate flow rate measurement by a vibratory meter and not just to the embodiments described above and shown in the accompanying figures. For example, detecting the inaccurate flow rate measurement during loading and unloading processes is not just applicable to bunkering or fuel tanker applications but to any empty-full-empty application. Accordingly, the scope of the embodiments described above should be determined from the following claims.

We claim:

1. A method of detecting an inaccurate flow rate measurement by a vibratory meter, the method comprising:
    flowing fluid through the vibratory meter and measuring a flow rate and a density of the fluid with the vibratory meter;
    calculating a density change rate of the fluid; and
    determining that the measured flow rate is inaccurate based on:
        a comparison between the measured density and a density reference; and
        a comparison between the density change rate and a density change rate reference.

2. The method of claim 1, further comprising excluding the measured flow rate from a total flow calculation after determining that the measured flow rate is inaccurate.

3. The method of claim 1, wherein the density reference is a density measured prior to a measurement of the density of the fluid in the vibratory meter.

4. The method of claim 1, wherein the comparison between the measured density and the density reference comprises determining if the measured density is less than the density reference.

5. The method of claim 1, wherein the comparison between the density change rate and the density change rate reference is comprised of determining if the density change rate is less than the density change rate reference.

6. The method of claim 1, wherein the determination that the measured flow rate is inaccurate is further based on a comparison of a measured drive gain of the vibratory meter and a drive gain reference.

7. The method of claim 6, wherein the comparison between the drive gain and the drive gain reference comprises determining if the drive gain is more than a drive gain reference.

8. The method of any claim 1, wherein the determination that the measured flow rate is inaccurate is further based on a comparison of the measured flow rate and a flow rate reference.

9. The method of claim 8, wherein the comparison between the measured flow rate and the flow rate reference comprises determining if the measured flow rate is less than a flow rate reference.

10. The method of claim 1, wherein the density change rate of the fluid is calculated from the measured density.

11. An apparatus for detecting an inaccurate flow rate measurement by a vibratory meter (5), the apparatus comprising:
a meter assembly (10) configured to receive at least one signal representing at least one measurement of a vibratory response;
a meter electronics (20) communicatively coupled to the meter assembly (10), the meter electronics (20) configured to determine a measured flow rate and a measured density from the at least one signal representing at least one measurement of a vibratory response; and
a processing system (910) of the meter electronics (20), the processing system (910) being configured to:
calculate a density change rate of the fluid; and
determine if the measured flow rate is inaccurate based on:
a comparison between the measured density and a density reference; and
a comparison between the density change rate and a density change rate reference.

12. The apparatus (900) of claim 11, wherein the processing system (910) is further configured to exclude the measured flow rate from a total flow calculation if the measured flow rate is inaccurate.

13. The apparatus (900) of claim 11, wherein the density reference is a density measured prior to a measurement of the density of the fluid in the vibratory meter (5).

14. The apparatus (900) of claim 1, wherein the comparison between the measured density and the density reference comprises determining if the measured density is less than the density reference.

15. The apparatus (900) of claim 11, wherein the comparison between the density change rate and the density change rate reference is comprised of determining if the density change rate is less than the density change rate reference.

16. The apparatus (900) of claim 11, wherein the processing system (910) is further configured to determine that the measured flow rate is inaccurate based on a comparison of a measured drive gain of the vibratory meter (5) and a drive gain reference.

17. The apparatus (900) of claim 16, wherein the comparison between the drive gain and the drive gain reference comprises determining if the drive gain is more than a drive gain reference.

18. The apparatus (900) of claim 11, wherein the processing system (910) is further configured to determine that the measured flow rate is inaccurate based on a comparison of the measured flow rate and a flow rate reference.

19. The apparatus (900) of claim 18, wherein the comparison between the measured flow rate and the flow rate reference comprises determining if the measured flow rate is less than a flow rate reference.

20. The apparatus (900) of claim 11, wherein the density change rate of the fluid is calculated from the measured density.

* * * * *

UNITED STATES PATENT AND TRADEMARK OFFICE
CERTIFICATE OF CORRECTION

PATENT NO. : 10,473,512 B2
APPLICATION NO. : 15/562806
DATED : November 12, 2019
INVENTOR(S) : Patrick John Zimmer and Craig Andrew Riggins Page 1 of 1

It is certified that error appears in the above-identified patent and that said Letters Patent is hereby corrected as shown below:

In the Claims

Column 17, Line 5, replace "of any claim 1" with --of claim 1--

Column 18, Line 8, replace "of claim 1" with --of claim 11--

Signed and Sealed this
Twenty-third Day of June, 2020

Andrei Iancu
*Director of the United States Patent and Trademark Office*